(12) United States Patent  
Zucchelli

(10) Patent No.: US 12,031,475 B2
(45) Date of Patent: Jul. 9, 2024

(54) TURBOCHARGING ASSEMBLY AND METHOD OF CONTROLLING OPERATION OF A TURBOCHARGING ASSEMBLY

(71) Applicant: TURBO SYSTEMS SWITZERLAND LTD., Baden (CH)

(72) Inventor: Alessandro Zucchelli, Baden (CH)

(73) Assignee: TURBO SYSTEMS SWITZERLAND LTD., Baden (CH)

( * ) Notice: Subject to any disclaimer, the term of this patent is extended or adjusted under 35 U.S.C. 154(b) by 0 days.

(21) Appl. No.: 18/278,592

(22) PCT Filed: Mar. 4, 2022

(86) PCT No.: PCT/EP2022/055566
§ 371 (c)(1),
(2) Date: Aug. 23, 2023

(87) PCT Pub. No.: WO2022/184902
PCT Pub. Date: Sep. 9, 2022

(65) Prior Publication Data
US 2024/0133338 A1    Apr. 25, 2024

(30) Foreign Application Priority Data
Mar. 4, 2021 (EP) .................................. 21160717

(51) Int. Cl.
*F02B 37/10* (2006.01)
*F02B 39/10* (2006.01)
(Continued)

(52) U.S. Cl.
CPC .............. *F02B 37/10* (2013.01); *F02B 39/10* (2013.01); *F02M 35/14* (2013.01); *F04D 17/10* (2013.01);
(Continued)

(58) Field of Classification Search
CPC .......... F02M 35/14; F02B 37/10; F02B 39/10
See application file for complete search history.

(56) References Cited

U.S. PATENT DOCUMENTS 4,667,769 A    5/1987  Appel
6,102,672 A    8/2000  Woollenweber et al.
(Continued)

FOREIGN PATENT DOCUMENTS

DE    102016221639 A1    5/2018
JP        S60212622 A    10/1985

OTHER PUBLICATIONS

International Search Report and Written Opinion in Application No. PCT/EP2022/055566, dated Jun. 15, 2022, 14 pages.
(Continued)

*Primary Examiner* — Ngoc T Nguyen
(74) *Attorney, Agent, or Firm* — Meunier Carlin & Curfman LLC

(57) ABSTRACT

A turbocharging assembly is described. The turbocharging assembly includes a compressor having a compressor wheel and a turbine having a turbine wheel. The turbine wheel and the compressor wheel are mounted back-to-back on a shaft. The shaft is coupled to a power converter provided in front of the compressor wheel. Additionally, the turbocharging assembly includes a housing extension encasing the power converter. The housing extension is connected with a compressor housing. The power converter includes a rotor and a stator. The stator is mounted to the housing extension. Further, the turbocharging assembly includes a filter silencer arranged between the compressor and the power converter. Yet further, the turbocharging assembly includes a blower mounted to the shaft. The blower is arranged at a side of the power converter facing away from the compressor.

15 Claims, 2 Drawing Sheets

(51) Int. Cl.
*F02M 35/14* (2006.01)
*F04D 17/10* (2006.01)
*F04D 29/28* (2006.01)
*H02K 7/14* (2006.01)
*H02K 7/18* (2006.01)

(52) U.S. Cl.
CPC ............ *F04D 29/284* (2013.01); *H02K 7/14* (2013.01); *H02K 7/1823* (2013.01)

(56) References Cited

U.S. PATENT DOCUMENTS

| | | |
|---|---|---|
| 2011/0239648 A1 | 10/2011 | Shiraishi |
| 2017/0167511 A1 | 6/2017 | Tsuji et al. |
| 2018/0001984 A1 | 1/2018 | Yamashita et al. |
| 2019/0145416 A1 | 5/2019 | Donato et al. |
| 2020/0028189 A1* | 1/2020 | Rollag .............. H01M 8/04753 |
| 2020/0248704 A1 | 8/2020 | Baeuerle et al. |

OTHER PUBLICATIONS

Search Report in European Application No. 21160717.1, dated Jun. 28, 2021, 9 pages.

* cited by examiner ically occur in the vicinity of the turbine during operation. Moreover, the turbocharging assembly according to embodiments described herein, beneficially provides for a better wheel and shaft balancing as compared to the state of the art.

TURBOCHARGING ASSEMBLY AND METHOD OF CONTROLLING OPERATION OF A TURBOCHARGING ASSEMBLY

TECHNICAL FIELD

Embodiments of the present disclosure relate to turbocharging assemblies and methods of controlling operation of the same.

BACKGROUND

Charging systems such as exhaust gas turbochargers are known to be used for increasing the power of an internal combustion engine. In such an exhaust gas turbocharger, a turbine is provided in the exhaust gas path of the internal combustion engine, and a compressor is arranged upstream of the internal combustion engine, which is connected to the turbine via a common shaft. The shaft is typically supported by a shaft bearing supported in a bearing housing. Thus, an exhaust gas turbocharger is generally constituted by a rotor, a bearing assembly for the shaft, flow-guiding housing sections (compressor housing and turbine housing) and a bearing housing. The rotor includes a shaft, an impeller and a turbine wheel.

With charging of an internal combustion engine by means of an exhaust gas turbocharger, the capacity and therefore the fuel mixture in the cylinders are increased and a noticeable power increase for the engine is thereby gained. Optionally, the energy which is stored within the exhaust gas of an internal combustion engine can be converted into electrical or mechanical energy, e.g. by means of a power turbine. In this case, instead of a compressor, as in the case of the exhaust gas turbocharger, a generator or a mechanical consumer is connected to the turbine shaft.

However, it has been found that conventional turbocharging assemblies, particularly turbocharging assemblies having a power converter, can still be improved, particularly with respect to compactness, efficiency and mass balance.

SUMMARY

In light of the above, a turbocharging assembly and a method of controlling operation of a turbocharging assembly according to the independent claims are provided. Further aspects, advantages, and features are apparent from the dependent claims, the description, and the accompanying drawings.

According to an aspect of the present disclosure, a turbocharging assembly is provided. The turbocharging assembly includes a compressor having a compressor wheel and a turbine having a turbine wheel. The turbine wheel and the compressor wheel are mounted back-to-back on a shaft. The shaft is coupled to a power converter provided in front of the compressor wheel. Additionally, the turbocharging assembly includes a housing extension encasing the power converter. The housing extension is connected with a compressor housing. The power converter includes a rotor and a stator. The stator is mounted to the housing extension. Further, the turbocharging assembly includes a filter silencer arranged between the compressor and the power converter. Yet further, the turbocharging assembly includes a blower mounted to the shaft. The blower is arranged at a side of the power converter facing away from the compressor.

Accordingly, compared to the state of the art, an improved turbocharging assembly is provided. In particular, by providing a back-to-back configuration of the turbine wheel and the compressor wheel and arranging the power converter provided in front of the compressor wheel a more compact design of a turbocharging assembly with a power converter can be provided. Further, by providing the power converter in front of the compressor wheel, the power converter can be protected from high temperatures, which typically occur in the vicinity of the turbine during operation. Moreover, the turbocharging assembly according to embodiments described herein, beneficially provides for a better wheel and shaft balancing as compared to the state of the art.

According to a further aspect of the present disclosure, a method of controlling operation of a turbocharging assembly according to any embodiments described herein is provided. The method includes controlling a power converter. The power converter is provided in front of a compressor wheel of a compressor. The compressor wheel and a turbine wheel of a turbine are mounted back-to-back mounted on a shaft coupled with the power converter.

BRIEF DESCRIPTION OF THE DRAWINGS

So that the manner in which the above recited features of the present disclosure can be understood in detail, a more particular description of the disclosure, briefly summarized above, may be had by reference to embodiments. The accompanying drawings relate to embodiments of the disclosure and are described in the following.

DETAILED DESCRIPTION OF EMBODIMENTS

Reference will now be made in detail to the various embodiments, one or more examples of which are illustrated in each figure. Each example is provided by way of explanation and is not meant as a limitation. For example, features illustrated or described as part of one embodiment can be used on or in conjunction with any other embodiment to yield yet a further embodiment. It is intended that the present disclosure includes such modifications and variations.

Within the following description of the drawings, the same reference numbers refer to the same or to similar components. Generally, only the differences with respect to the individual embodiments are described. Unless specified otherwise, the description of a part or aspect in one embodiment can apply to a corresponding part or aspect in another embodiment as well.

Figure 1:
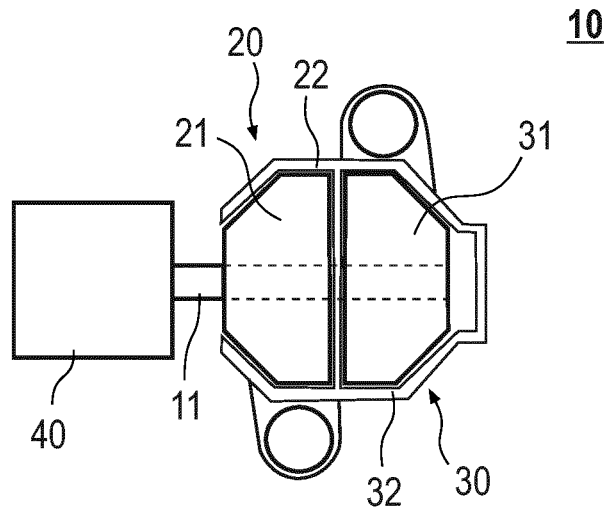
FIG. 1 shows a schematic view of a turbocharging assembly according to embodiments described herein.

With exemplary reference to FIG. 1, a turbocharging assembly 10 according to the present disclosure is described. According to embodiments, which can be combined with other embodiments described herein, the turbocharging assembly 10 a compressor 20 having a compressor wheel 21. Additionally, the turbocharging assembly 10 includes a turbine 30 having a turbine wheel 31. The turbine wheel 31 and the compressor wheel 21 are mounted back-to-back on a shaft 11.

As used herein, the term "back-to-back" refers to the positioning of two rotors or wheels, particularly the compressor wheel 21 and the turbine wheel 31, that are mounted for rotation on a common shaft, particularly the shaft 11 as described herein. Each rotor, i.e. the compressor wheel 21 and the turbine wheel 31, has a set of impeller blades on one side and a substantially flat or planar surface on the other side (without any blades). The two non-bladed surfaces of the rotors, i.e. the compressor wheel 21 and the turbine wheel 31, face towards each other. The two sets of blades, i.e. the compressor wheel blades and the turbine wheel blades extend away from each other, in opposite directions.

Figure 3:
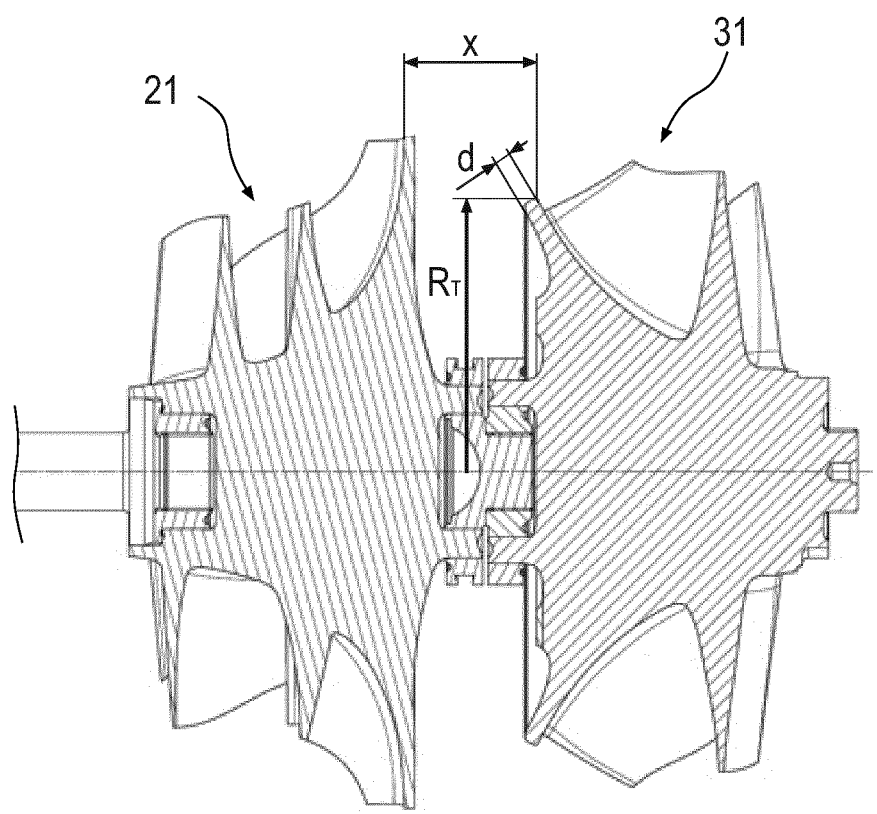
FIG. 3 shows a schematic sectional view of a back-to-back configuration of a compressor wheel and a turbine wheel according to embodiments described herein.

In particular, according to embodiments which can be combined with any other embodiments described herein, a back-to-back configuration of the compressor wheel and the turbine wheel can be understood in that a distance between the compressor wheel and the turbine wheel is minimized. For example, as indicated in FIG. 3, the back-to-back configuration may be characterized by a first ratio r, wherein x is the distance provided between the compressor wheel 21 and the turbine wheel 31, and wherein $R_T$ is the radius of the back-wall of the turbine wheel 31. Typically, the first ratio $R_T$ is $R_1 \leq 0.8$, particularly $R_1 \leq 0.7$, more particularly $R_1 \leq 0.6$. Additionally, or alternatively, as indicated in FIG. 3, the back-to-back configuration may be characterized by a second ratio $R_2 = x/d$, wherein x is the distance provided between the compressor wheel 21 and the turbine wheel 31, and wherein d is the back-wall thickness of the turbine wheel 31. Typically, the second ratio $R_2$ is $9 \leq R_2 \leq 12$. Further, it is to be understood, that according to embodiments which can be combined with any other embodiments, no power converter or component of a power converter is provided between the compressor wheel 21 and the turbine wheel 31. In other words, the space between the back-side of the turbine wheel and the compressor wheel is free of any power converter or component of a power converter, such as a rotor of an electric power converter.

The shaft 11 is coupled to a power converter 40. In particular, the shaft 11 can be directly coupled with the power converter 40. The expression "directly coupled" is to be understood in that there are no intermediate elements, e.g. a gearing and/or a clutch, between the coupled components. Accordingly, it is to be understood that the shaft 11 can be directly and mechanically coupled to a component of the power converter 40, e.g. one or more first electromagnetic coils, particularly a rotor 41 as described herein. As exemplarily shown in FIG. 1, the power converter 40 is provided in front of the compressor wheel 21, i.e. on an air intake side of the compressor. Form FIGS. 1 and 2, it is to be understood, that the power converter 40 can be arranged directly in front of the compressor on the air intake side of the compressor (FIG. 1) or an intermediate component, such as a filter silencer 50 as described herein, can be provided between the compressor and the power converter 40.

By providing turbocharging assembly with a back-to-back configuration of the turbine wheel and the compressor wheel and arranging the power converter provided in front of the compressor wheel, a more compact design of a turbocharging assembly ca be provided as compared to the state of the art, such that the overall footprint of the turbocharging assembly can be reduced. Further, arranging the power converter in front of the compressor wheel is beneficial for protecting the power converter from high temperatures, which typically occur in the vicinity of the turbine during operation. Moreover, the back-to-back configuration of the turbine wheel and the compressor wheel combined with the arrangement of the power converter in front of the compressor wheel has the advantage that the overall mass balancing of the rotating components, particularly the shaft and the wheels, can be improved. In this regard, it is to be noted that the power converter, particularly components of the power converter coupled to the common shaft, may act as a counter mass with respect to the turbine wheel and the compressor wheel.

In the present disclosure, a power converter can be understood as a device which is configured for converting electrical power or hydraulic power into mechanical power, e.g. in case the power converter is an electrical or hydraulic motor. Further, a power converter can also be understood as a device configured converting mechanical power into electrical power, e.g. in case the power converter is an alternator. Accordingly, a power converter as described herein can be an electric power converter or a hydraulic power converter. In particular the power converter as described herein can be a motor, particularly an electrical or hydraulic motor, or an alternator.

Figure 2:
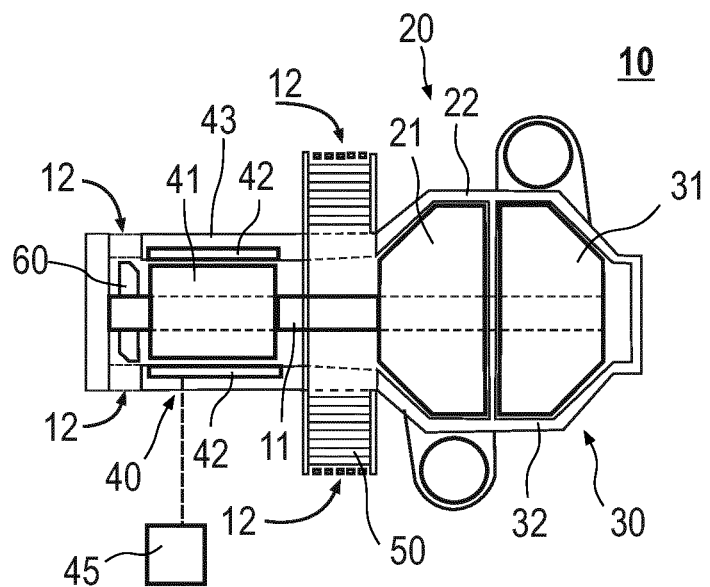
FIG. 2 shows a schematic view of a turbocharging assembly according to further optional embodiments described herein.

With exemplary reference to FIGS. 1 and 2, according to embodiments, which can be combined with any other embodiments described herein, a compressor housing 22 encasing the compressor wheel 21 is connected to a turbine housing 32 encasing the turbine wheel 31.

In other words, each of the compressor housing 22 and the turbine housing 32 may be separate housing, and the compressor housing 22 may be connected with the separate turbine housing 32, for instance via welded, bolted or other mechanical connection. Alternatively, the compressor housing 22 may be integrally connected with the turbine housing 32. In other words, the compressor housing 22 and the turbine housing 32 can be single piece structure forming a common housing. For example, the common housing can be an integrated single piece structure of casted material.

According to embodiments, which can be combined with any other embodiments described herein, the power converter 40 includes one or more first electromagnetic coils and one or more second electromagnetic coils (not explicitly shown). Typically, the one or more first electromagnetic coils are coupled with the shaft 11 and the one or more second electromagnetic coils are provided around the one or more first electromagnetic coil. The power converter 40 is configured for providing a rotational speed difference between the one or more first electromagnetic coils and the one or more second electromagnetic coils during operation. Typically, the one or more first electromagnetic coils are mechanically coupled with the shaft 11, such that a rotation of the shaft 11 is transmitted to the one or more first electromagnetic coils.

With exemplary reference to FIG. 2, according to embodiments, which can be combined with any other embodiments described herein, the power converter 40 includes a rotor 41 and a stator 42. In particular, the rotor 41 includes one or more first electromagnetic coils and the stator 42 includes one or more second electromagnetic coils. Typically, the rotor 41 is connected to the shaft 11.

According to embodiments, which can be combined with any other embodiments described herein, the turbocharging assembly 10 further includes a filter silencer 50 arranged between the compressor 20 and the power converter 40, as exemplarily shown in FIG. 2. Accordingly, the air flow into the compressor can be provided through the filter silencer 50 arranged in-between the compressor 20 and the power converter 40. In other words, as exemplarily indicated in FIG. 2, the air flow 12 into the filter silencer 50 may be provided between the power converter 40 and the compressor wheel 21, which can be beneficial for protecting the power converter 40 from heat or even cooling the power converter 40.

With exemplary reference to FIG. 2, according to embodiments, which can be combined with any other embodiments described herein, the turbocharging assembly 10 further includes a blower 60 mounted to the shaft 11. In particular, the blower 60 is arranged at a side of the power converter 40 facing away from the compressor 20. Typically, the blower 60 is a fan configured for providing air towards the power converter 40, i.e. in a direction towards the compressor. Accordingly, the blower 60 may act as a cooler for the power converter 40. Further, the blower 60 can improve the air intake into the compressor 20.

According to embodiments, which can be combined with any other embodiments described herein, the turbocharging assembly 10 further includes a housing extension 43 encasing the power converter 40, as exemplarily shown in FIG. 2. The housing extension 43 can be connected with the compressor housing 22. For instance, the housing extension 43 can be directly connected to the compressor housing 22. Alternatively, the housing extension 43 can be connected with the compressor housing 22 via an intermediate component, e.g. the filter silencer 50 as described herein. As exemplarily shown in FIG. 2, the stator 42 can be mounted to the housing extension 43. According to an example, the stator 42 can be integrated into the housing 43, which may be beneficially for improving compactness and reducing installation space.

According to embodiments, which can be combined with any other embodiments described herein, the turbocharging assembly includes power storage 45 coupled to the power converter 40, as exemplarily indicated in FIG. 2. For instance, the power storage 45 can be a battery.

According to a further aspect of the present disclosure, a method of controlling operation of a turbocharging assembly 10 according to any embodiments described herein is provided. The method includes controlling a power converter 40. The power converter 40 is provided in front of a compressor wheel 21 of a compressor 20. The compressor wheel 21 and a turbine wheel 31 of a turbine 30 are mounted back-to-back on a shaft 11 coupled with the power converter 40.

Accordingly, beneficially the turbocharging assembly can be controlled by the power converter, e.g. in order to speed up and reduce the startup time of the turbocharging assembly. Further, the power converter can be used to reduce turbo lag during engine transitional operation. Moreover, it is to be understood that the power converter can be used for power generation.

While the foregoing is directed to embodiments, other and further embodiments may be devised without departing from the basic scope, and the scope is determined by the claims that follow.

REFERENCE NUMBERS 10 turbocharger assembly
11 shaft
12 air flow
20 compressor
21 compressor wheel
22 compressor housing
30 turbine
31 turbine wheel
32 turbine housing
40 power converter
41 rotor
42 stator
43 housing extension
45 power storage
50 filter silencer
60 blower

The invention claimed is:

1. A turbocharging assembly, comprising:
compressor having a compressor wheel,
a turbine having a turbine wheel, the turbine wheel and the compressor wheel being mounted back-to-back on a shaft, the shaft being coupled to a power converter provided in front of the compressor wheel,
a housing extension encasing the power converter, the housing extension being connected with a compressor housing, wherein the power converter comprises a rotor and a stator, the stator being mounted to the housing extension,
a filter silencer arranged between the compressor and the power converter, and
a blower mounted to the shaft, the blower being arranged at a side of the power converter facing away from the compressor.

2. The turbocharging assembly of claim 1, wherein the power converter is an electric power converter or a hydraulic power converter.

3. The turbocharging assembly of claim 1, wherein the power converter is a motor or an alternator.

4. The turbocharging assembly of claim 1, wherein the compressor housing encasing the compressor wheel is connected to a turbine housing encasing the turbine wheel.

5. The turbocharging assembly of claim 1, wherein the power converter comprises one or more first electromagnetic coils and one or more second electromagnetic coils, wherein the one or more first electromagnetic coils are coupled with the shaft, wherein the one or more second electromagnetic coils are provided around the one or more first electromagnetic coils, and wherein the power converter is configured for providing a rotational speed difference between the one or more first electromagnetic coils and the one or more second electromagnetic coils during operation.

6. The turbocharging assembly of claim 1, wherein the rotor comprises one or more first electromagnetic coils and the stator comprising one or more second electromagnetic coils, and wherein the rotor is connected to the shaft.

7. The turbocharging assembly of claim 1, further comprising a power storage coupled to the power converter.

8. The turbocharging assembly of claim 1, wherein a first ratio $R_1 = x/R_T$ is $R_1 \leq 0.8$, wherein x is the distance provided between the compressor wheel and the turbine wheel and wherein $R_T$ is the radius of the back-wall of the turbine wheel.

9. The turbocharging assembly of claim 1, wherein a second ratio $R_2 = x/d$ is $9 \leq R_2 \leq 12$, wherein x is the distance provided between the compressor wheel and the turbine wheel, and wherein d is the back-wall thickness of the turbine wheel.

10. The turbocharging assembly of claim 1, wherein between the compressor wheel and the turbine wheel no power converter or component of a power converter is provided.

11. A method of controlling operation of a turbocharging assembly, the turbocharging assembly comprising:
compressor having a compressor wheel,
a turbine having a turbine wheel, the turbine wheel and the compressor wheel being mounted back-to-back on a shaft, the shaft being coupled to a power converter provided in front of the compressor wheel,
a housing extension encasing the power converter, the housing extension being connected with a compressor housing, wherein the power converter comprises a rotor and a stator, the stator being mounted to the housing extension, a filter silencer arranged between the compressor and the power converter, and a blower mounted to the shaft, the blower being arranged at a side of the power converter facing away from the compressor, wherein the operation of the turbocharging assembly is controlled by controlling the power converter.

12. The turbocharging assembly of claim 1, wherein the power converter is provided on an air intake side of the compressor wheel.

13. The turbocharging assembly of claim 1, wherein the compressor housing is integrally connected within the turbine housing.

14. The turbocharging assembly of claim 10, wherein the first ratio is $R_1 \leq 0.7$.

15. The turbocharging assembly of claim 10, wherein the first ratio is $R_1 \leq 0.6$.

* * * * *